United States Patent Office 3,184,485
Patented May 18, 1965

3,184,485
5,10 - METHYLENE - 19 - NOR - ANDROSTANES, -ANDROSTENES AND -ANDROSTADIENES
Lawrence H. Knox, Mexico City, Mexico, assignor to Syntex Corporation, Panama, Panama, a corporation of Panama
No Drawing. Filed June 11, 1963, Ser. No. 286,913
Claims priority, application Mexico, Dec. 10, 1962, 70,104
19 Claims. (Cl. 260—397.4)

This invention relates to novel cyclopentanoperhdyrophenanthrene derivatives.

More particularly, this invention relates to novel 5,10-methylene-19-nor-androstane derivatives represented by the general formula:

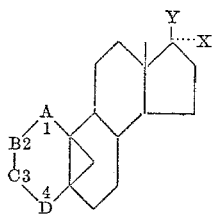

wherein the grouping:

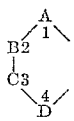

in ring A represents:

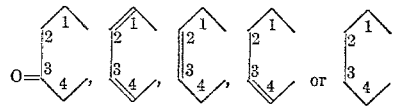

the carbon and hydrogen atoms present in the 1-, 2-, 3-, and 4-positions in these groupings being omitted for the sake of clarity; X represents hydrogen or a lower alkyl, e.g., methyl, ethyl, propyl and the like, lower alkenyl, e.g., vinyl and the like, or lower alkinyl, e.g., ethinyl and the like, group; Y represents a hydroxyl group or an acyloxy group containing less than 12 carbon atoms, and X and Y taken together can also represent a keto group.

The novel 5,10-methylene-19-nor-androstanes, -androstenes and -androstadienes represented by Formula I above can also be represented by the following more specific formulas:

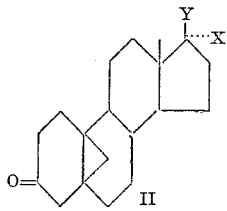

II

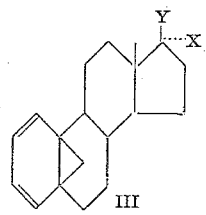

III

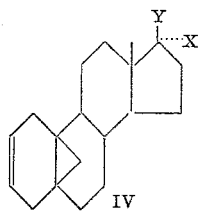

IV

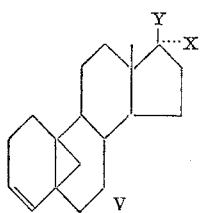

V

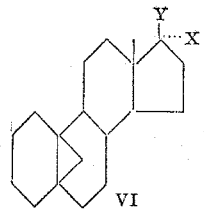

VI

In these formulas X and Y have the same meanings as set forth hereinabove for Formula I.

These novel compounds are obtained by methods such as those illustrated by the following reaction sequences:

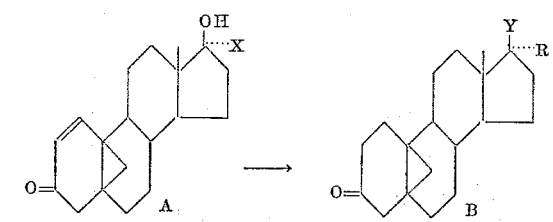

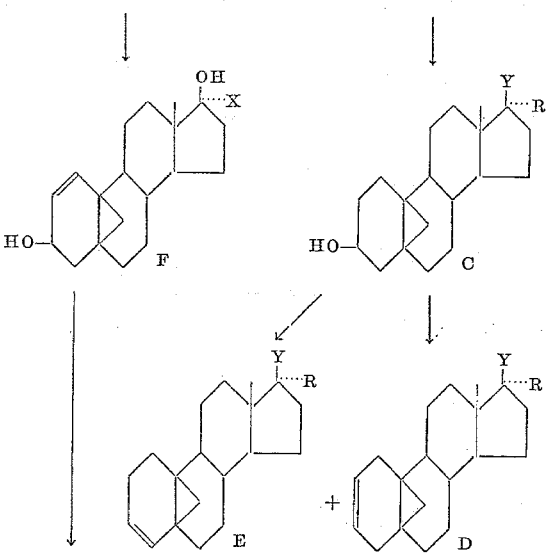

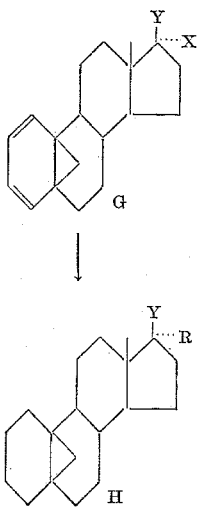

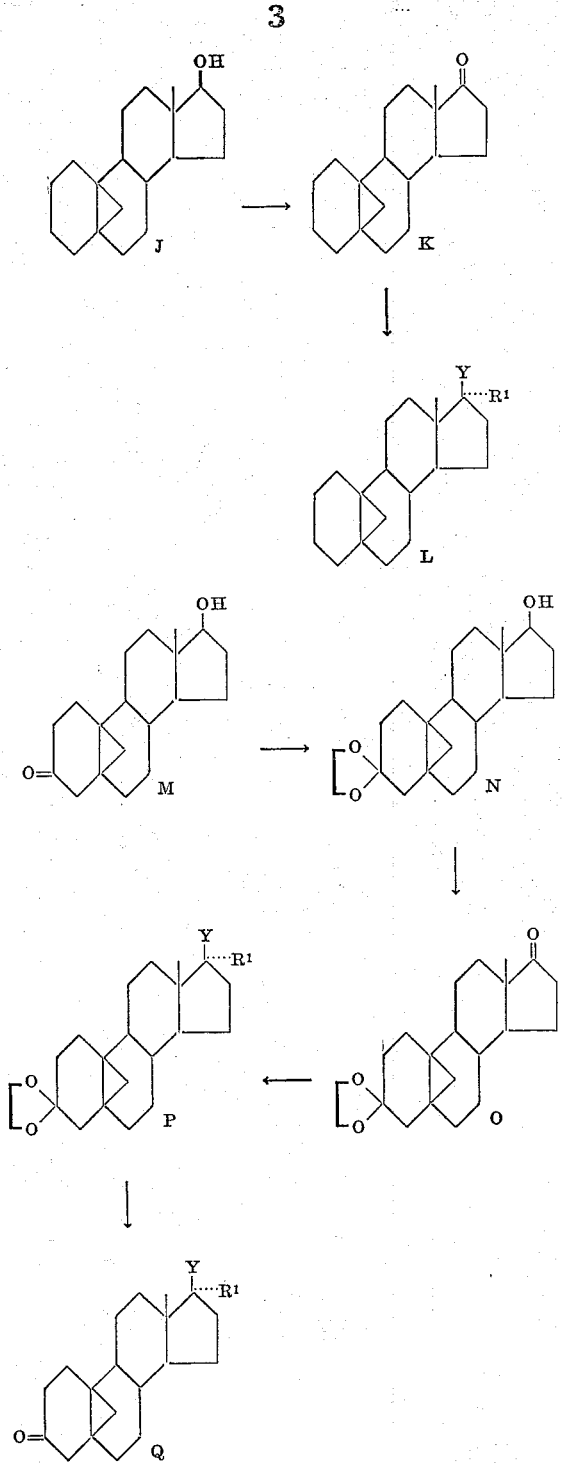

In these formulas, X and Y have the same meanings as set forth hereinabove for Formula I, R represents hydrogen or a lower alkyl group and $R^1$ represents a lower alkenyl or lower alkinyl group.

In practicing the methods outlined above, 5,10-methylene-19-nor-$\Delta^1$-androsten-17β-ol-3-one or the corresponding 17α-lower alkyl, alkenyl or alkinyl derivatives thereof (A), obtained by reacting the corresponding 19-hydroxy-$\Delta^4$-3-keto-androstenes with 2-chloro-1,1,2-trifluorotriethylamine or 1,1,2,2-tetrafluoroethyldimethylamine in an inert organic solvent, as described in my copending U.S. Patent application Serial No 286,931, filed on June 11, 1963, are hydrogenated, preferably in ethanol solution in the presence of a palladium catalyst, e.g., a 5% palladium-charcoal catalyst, to produce, by absorption of 1, 2 or 3 molar equivalents of hydrogen, 5,10-methylene-19-nor-androstan-17β-ol-3-one or the corresponding 17α-lower alkyl derivatives (B; Y=OH).

These 5,10 - methylene-19-nor-androstan-17β-ol-3-ones can then be esterified by conventional methods, e.g., by reaction with acid anhydrides or acid chlorides containing less than 12 carbon atoms in pyridine solution in the case of the 17α-unsubstituted compounds, or with acid anhydrides of the character described in benzene solution in the presence of p-toluenesulfonic acid in the case of the 17a-lower alkyl derivatives, to give the corresponding 17-esters (B; Y=acyloxy).

Treatment of these 17-esters with sodium borohydride in anhydrous tetrahydrofuran results in reduction of the keto group at the 3-position without concomitant saponification of the 17-acyloxy group, thus resulting in the corresponding 3-hydroxy compounds (C; Y=acyloxy). The 3-hydroxy compounds are then dehydrated, e.g., with thionyl chloride in pyridine or with 2-chloro-1,1,2-trifluorotriethylamine in methylene chloride, acetonitrile or tetrahydrofuran solution, at a low temperature, preferably between about 0° C. and about 20° C., for approximately 16 hours to produce a mixture of the 17-esters of the corresponding 3 - desoxy-$\Delta^2$- and 3 - desoxy-$\Delta^3$-compounds (D and E; Y=acyloxy). The corresponding unesterified compounds (D and E; Y=OH) are obtained by conventional saponification of the 17-esters, preferably by refluxing the esters with a solution of potassium hydroxide in methanol.

Reduction of 5,10-methylene-19-nor-$\Delta^1$-androsten-17β-ol-3-one or the corresponding 17α-lower alkyl, alkenyl or alkinyl derivatives thereof (A) with sodium borohydride or lithium aluminum hydride in tetrahydrofuran affords the corresponding 3,17-diols (F). Upon treatment of these diols with aqueous acetic acid, preferably using 50% aqueous acetic acid at steam bath temperature for from about 1 to about 4 hours, the corresponding 3-desoxy-$\Delta^{1,3}$-compounds (G; Y=OH), i.e., 5,10-methylene-19-nor-$\Delta^{1,3}$-androstadien-17β-ol or the corresponding 17α-alkyl, -alkenyl and -alkinyl compounds, are obtained.

Hydrogenation of these $\Delta^{1,3}$-dienes, preferably in ethanol solution in the presence of a palladium-charcoal catalyst, until absorption of 2, 3 or 4 equivalents of hydrogen has taken place, produces 5,10-methylene-19-nor-androstan-17β-ol or the corresponding 17α-lower alkyl derivatives (H; Y=OH).

Both the $\Delta^{1,3}$-dienes and the corresponding ring A-saturated compounds (G and H; Y=OH) can be converted into the corresponding 17-esters (G and H; Y=acyloxy) by treatment with acid anhydrides or chlorides of the character described, using conventional methods.

By oxidizing 5,10 - methylene-19-nor-androstan-17β-ol (J) with chromic acid in acetic acid or with an 8 N solution of chromic acid in acetone to produce 5,10-methylene-19-nor-androstan-17-one (K), and then reacting this 17-one with a lower alkenyl or alkinyl magnesium halide, e.g. vinyl or ethinyl magnesium bromide, or with potassium acetylide, employing methods well known in the art, the corresponding 17α-lower alkenyl and -alkinyl derivatives are obtained (L; Y=OH).

Similarly, starting from 5,10-methylene-19-nor-$\Delta^2$-androsten-17β-ol and 5,10 - methylene-19-nor-$\Delta^3$-androsten-17β-ol, the corresponding 17α-alkenyl and 17α-alkinyl derivatives are obtained.

In addition, by reacting 5,10-methylene-19-nor-androstan-17β-ol-3-one (M) with a ketalizing agent, e.g., with ethylene glycol or 2-methyl-2-ethyl-1,3-dioxolane at reflux temperature in the presence of p-toluenesulfonic acid, to form the 3-ketal, e.g., 5,10-methylene-3-ethylenedioxy-19-nor - androstan - 17β-ol (N), oxidizing the 3 - ketal, preferably using chromium trioxide in pyridine, to produce the corresponding 17-one, e.g., 5,10 - methylene - 3 - ethylenedioxy-19-nor-androstan-17-one (O), then reacting this 17-one with a lower alkenyl or alkinyl magnesium halide, e.g., vinyl or ethylinyl magnesium bromide, or with potassium acetylide, again employing well-known methods, to produce the corresponding 17α-lower alkenyl and -alkinyl derivatives (P; Y=OH), e.g., 5,10-methylene-3-ethylenedioxy 17α-vinyl-19-nor-androstan-17β-ol and 5,10-methylene-3-ethylenedioxy-17α-ethinyl-19-nor-androstan-17β-ol, and finally hydrolyzing the 3-ketal group in these 17α-lower alkenyl and -alkinyl derivatives, preferably by heating them in acetone solution with p-toluenesulfonic acid at room temperature, the corresponding 4-keto-17α-lower alkenyl and -alkinyl derivatives are obtained (Q; Y=OH).

The 17-esters of these 17α-alkenyl and -alkinyl derivatives (L, Q and the corresponding $\Delta^2$- and $\Delta^3$-compounds; Y=acyloxy) are obtained by the conventional method described hereinabove.

Finally, oxidation of 5,10-methylene-19-nor-androstan-17β-ol-3-one, 5,10-methylene-19-nor-$\Delta^2$-androsten-17β-ol, 5,10-methylene-19-nor-$\Delta^3$-androsten-17β-ol and 5,10-methylene-19-nor-$\Delta^{1,3}$-androstadien-17β-ol, respectively, e.g., with chromic acid in aqueous acetic acid, produces 5,10-methylene-19-nor-androstan-3,17-dione, 5,10-methylene-19-nor-$\Delta^2$-androsten-17-one, 5,10-methylene-19-nor-$\Delta^3$-androsten-17-one and 5,10-methylene-19-nor-$\Delta^{1,3}$-androstadien-17-one, respectively.

The acyloxy groups referred to above are derived from hydrocarbon carboxylic acids containing less than 12 carbon atoms. These acids may be saturated or unsaturated, of straight, branched, cyclic or cyclic-aliphatic chain or aromatic, and may be substituted by functional groups such as hydroxy, alkoxy containing up to 5 carbon atoms, acyloxy containing up to 12 carbon atoms, nitro, amino or halogen. Typical ester groups are the acetate, propionate, enanthate, benzoate, trimethylacetate, t-butylacetate, phenoxyacetate, cyclopentylpropionate, aminoacetate and β-chloropropionate.

The compounds of the present invention are anabolic agents showing a favorable anabolic-androgenic ratio. They also possess anti-estrogenic activity, inhibit the activity of the pituitary gland and lower blood cholesterol levels.

The following examples serve to illustrate the present invention but are not intended to restrict the scope thereof:

*Example I*

A solution of 1 g. of 5,10-methylene-19-nor-$\Delta^1$-androsten-17β-ol-3-one, obtained as described in my copending U.S. patent application Ser. No. 286,931, filed June 11, 1963, in 150 cc. of 96% ethanol was added to 1 g. of 5% palladium-charcoal previously reduced, and the mixture was hydrogenated at room temperature and atmospheric pressure until 1 molar equivalent of hydrogen was obsorbed (approximately in 30 minutes). The catalyst was filtered and the filtrate evaporated to dryness. By crystallization of the residue from acetone hexane there was obtained the pure 5,10-methylene-19-nor-androstan-17β-ol-3-one.

*Example II*

A solution of 3 g. of 5,10-methylene-19-nor-$\Delta^1$-androsten-17β-ol-3-one in 150 cc. of anhydrous tetrahydrofuran was added over a 15 minute period to a stirred suspension of 3 g. of lithium aluminum hydride in 150 cc. of anhydrous tetrahydrofuran. The mixture was refluxed for 2 hours, cooled and carefully treated with 10 cc. of ethyl acetate and 5 cc. of water. Solid sodium sulfate was added, the inorganic material filtered off and washed several times with hot ethyl acetate; after evaporation of the organic solutions there was produced a crude product which was purified by crystallization from acetone-hexane, thus giving 5,10-methylene-19-nor-$\Delta^1$-androstene-3β,17β-diol.

The same compound was obtained from 5,10-methylene-19-nor-$\Delta^1$-androstene-3,17-dione.

1 g. of 5,10-methylene-19-nor-$\Delta^1$-androstene-3β,17β-diol was dissolved in 25 cc. of 50% acetic acid and the resulting solution was heated on the steam bath for 4 hours. After this period of time it was diluted with water, the formed precipitate was filtered, washed to neutrality and recrystallized from acetone-ether. There was thus obtained 5,10-methylene-19-nor-$\Delta^{1,3}$-androstadien-17β-ol.

*Example III*

In accordance with the method described in Example I, 500 mg. of 5,10-methylene-19-nor-$\Delta^{1,3}$-androstadien-17β-ol were reduced in the presence of 500 mg. of 5% palladium charcoal in ethanol, until absorption of 2 molar equivalents hydrogen, thus giving 5,10-methylene-19-nor-androstan-17β-ol.

*Example IV*

A mixture of 1 g. of 5,10-methylene-19-nor-androstan-17β-ol-3-one, 4 cc. of pyridine and 4 cc. of acetic anhydride was kept at room temperature overnight, poured into ice water and the formed precipitate collected by filtration, washed with water and dried; crystallization from acetone-hexane gave the acetate of 5,10-methylene-19-nor-androstan-17β-ol-3-one.

In a similar manner, 5,10-methylene-19-nor-$\Delta^{1,3}$-androstadien-17β-ol and 5,10-methylene-19-nor-androstan-17β-ol were converted into the corresponding acetates.

*Example V*

To a solution of 1 g. of the acetate of 5,10-methylene-19-nor-androstan-17β-ol-3-one in 50 cc. of anhydrous tetrahydrofuran there was added 1 g. of sodium borohydride, and the mixture kept at room temperature for 16 hours. The excess of reagent was decomposed by the addition of acetic acid, the solution was concentrated to a small volume under vacuo and diluted with water. The product was extracted with ethyl-acetate, the extract washed with water, dried and evaporated. The solid residue was purified by crystallization from acetone-hexane, to produce the 17-acetate of 5,10-methylene-19-nor-androstane 3β,17β-diol.

A solution of 500 mg. of the foregoing compound in 15 cc. of anhydrous tetrahydrofuran was treated with 1.5 equivalents of 2-chloro-1,1,2-trifluoro-triethylamine and the mixture allowed to stand at 0° C. for 16 hours. It was then evaporated to dryness under reduced pressure and the residue chromatographed on 20 g. of Florisil, thus producing the acetate of 5,10-methylene-19-nor-$\Delta^2$-androsten-17β-ol, and the acetate of 5,10-methylene-19-nor-$\Delta^3$-androsten-17β-ol.

*Example VI*

To a solution of 150 mg. of the acetate of 5,10-methylene-19-nor-$\Delta^2$-androsten-17β-ol in 15 cc. of methanol there was added 100 mg. of potassium hydroxide dissolved in 1 cc. of water and the mixture refluxed for 1 hour, poured into water and the formed precipitate collected by filtration, thus producing 5,10-methylene-19-nor-$\Delta^2$-androsten-17β-ol.

In the same manner, starting from the acetate of 5,10-methylene-19-nor-$\Delta^3$-androsten-17β-ol there was obtained the corresponding free compound.

*Example VII*

1 g. of 5,10-methylene-17α-methyl-19-nor-$\Delta^1$-androsten-17β-ol-3-one was reduced with lithium aluminum hydride by following the method described in Example II and the 5,10-methylene-17α-methyl-19-nor-$\Delta^1$-androstene-3β,17β-diol thus obtained was submitted to a dehydration and a hydrogenation, by following the methods described in Examples II and III, to produce successively 5,10-methylene-17α-methyl-19-nor$\Delta^{1,3}$-androstadien-17β-ol and 5,10-methylene-17α-methyl-19-nor-androstan-17β-ol.

*Example VIII*

By hydrogenation of 1 g. of 5,10-methylene-17α-vinyl- 19-nor-Δ¹-androsten-17β-ol-3-one in ethanol solution and in the presence of 5% palladium charcoal until absorption of 2 molar equivalents of hydrogen there was obtained 5,10-methylene-17α-ethyl-19-nor-androstan-17β-ol-3-one.

In another experiment 5,10-methylene-17α-ethinyl-19-nor-Δ¹-androsten-17β-ol-3-one was used as the starting material, and the hydrogenation was continued until no more hydrogen was absorbed (approximately 3 molar equivalents) to produce also 5-10-methylene-17α-ethyl-19-nor-androstan-17β-ol-3-one.

Example IX

Example I was repeated but using as starting material 5,10 - methylene-17α-methyl-19-nor-Δ¹-androsten-17β-ol-3-one, thus producing 5,10-methylene-17α-methyl-19-nor-androstan-17β-ol-3-one.

The preceding compound was reduced with sodium borohydride and the 5,10-methylene-17α-methyl-19-nor-androstane-3,17-diol thus obtained was dehydrated with 2-chloro-1,1,2-trifluoro-triethylamine, by following the method described in Example VII to produce 5,10-methylene - 17α - methyl-19-nor-Δ²-androsten-17β-ol and 5,10-methylene-17α-methyl-19-nor-Δ³-androsten-17β-ol which were separated by chromatography on washed alumina.

Example X

A solution of 2 g. of 5,10-methylene-19-nor-Δ¹,³-androstadien-17β-ol in 40 cc. of acetone was cooled to 0° C. and treated under nitrogen atmosphere and with stirring with an 8 N solution of chromic acid (prepared by mixing 26 g. of chromium trioxide with 23 cc. of concentrated sulfuric acid and dilution with water to 100 cc.), until the color of the reagent persisted in the mixture. It was stirred for 5 minutes further at 0–5° C. and diluted with water. The precipitate was filtered, washed with water and dried under vacuo, thus producing 5,10-methylene-19-nor-Δ¹,³-androstadien-17-one which was purified by crystallization from acetone-ether.

By the same method, 5,10-methylene-19-nor-Δ²-androstene-17β-ol, 5,10-methylene-19-nor-Δ³-androsten-17β-ol and 5,10-methylene-19-nor-androstan-17β-ol were converted into 5,10-methylene-19-nor-Δ²-androsten-17-one, 5,10 - methylene - 19 - nor-Δ³-androsten-17-one and 5,10-methylene-19-nor-androstan-17-one.

Example XI

In accordance with the method described in Example 3, 1 g. of 5,10-methylene-17α-vinyl-19-nor-Δ¹-androsten-17β-ol-3-one was reduced with lithium aluminum hydride and the 5,10 - methylene-17α-vinyl-19-nor-Δ¹-androstene-3,17-diol was dehydrated with 50% aqueous acetic acid, by following the method of Example IV to produce 5,10-methylene-17α-vinyl-19-nor-Δ¹,³-androstadien-17β-ol.

Example XII

A mixture of 1 g. of 5,10-methylene-19-nor-Δ¹,³-androstadien-17-one, 100 cc. of dry benzene, thiophene-free, and 8 cc. of 3 N solution of vinyl magnesium bromide was refluxed for 6 hours; it was poured into a mixture of 500 cc. of ice-water and 15 g. of ammonium chloride under vigorous stirring; the benzene layer was separated, washed with dilute hydrochloric acid and then with water to neutral, dried over anhydrous sodium sulfate and evaporated; the residue was crystallized from acetone-ether thus yielding 5,10-methylene-17α-vinyl-19-nor-Δ¹,³-androstadien-17β-ol identical to that obtained in the preceding example.

By the same method 5,10-methylene-19-nor-Δ²-androsten-17-one and 5,10-methylene-19-nor-androstan-17-one were converted respectively into 5,10 - methylene - 17α-vinyl-19-nor-Δ²-androsten-17β-ol and 5,10-methylene-17α-vinyl-androstan-17β-ol.

Example XIII

To a solution of 500 mg. of 5,10-methylene-17α-methyl-19-nor-Δ¹-androsten-17β-ol-3-one in 20 cc. of anhydrous benzene there were added 100 mg. of p-toluenesulfonic acid and 1 cc. of acetic anhydride and the mixture kept at room temperature for 24 hours; it was poured into ice water and the resulting mixture stirred to effect hydrolysis of the excess of anhydride. The benzene layer was separated, washed with 10% sodium carbonate solution and water, dried over anhydrous sodium sulfate and evaporated to dryness under vacuo. The residue was crystallized from acetone-hexane to give the acetate of 5,10-methylene-17α-methyl-19-nor-Δ¹-androsten-17β-ol-3-one.

Example XIV

A solution of 1 g. of 5,10-methylene-19-nor-Δ¹,³-androstadien-17-one in 100 cc. of anhydrous benzene was added under nitrogen atmosphere to a solution prepared by dissolving 1.4 g. of potassium in 30 cc. in t-amyl alcohol. A slow stream of purified acetylene was passed through the solution for 40 hours, where upon the solution was diluted with water and extracted with benzene. The organic extracts were then washed to neutral and dried over anhydrous sodium sulfate. Evaporation of the solvent and chromatography of the residue on 50 g. of alkaline alumina gave the pure 5,10-methylene-17α-ethinyl-19-nor-Δ¹,³-androstadien-17β-ol.

In a similar manner 5,10-methylene-19-nor-Δ³-androsten-17-one and 5,10-methylene-19-nor-androstan-17-one were converted into 5,10-methylene-17α-ethinyl-19-nor-Δ³-androsten-17β-ol and 5,10-methylene-17α-ethinyl-19-nor-androstan-17β-ol.

Upon esterification of the preceding compounds, by following the method described in Example XIII, there were obtained the corresponding acetates.

Example XV

In accordance with the method of Example IV, the compounds below mentioned I were esterified with the indicated acid anhydrides to yield the respective esters II.

| I | Acylating | II |
| --- | --- | --- |
| 5,10-methylene-19-nor-Δ¹,³-androstadiene-17β-ol. | Propionic | Propionate of 5,10-methylene-19-nor-Δ¹,³-androstadien-17β-ol. |
| 5,10-methylene-19-nor-androstan-17β-ol-3-one. | Enanthic anhydride. | Enanthate of 5,10-methylene-19-nor-androstan-17β-ol-3-one. |
| 5,10-methylene-19-nor-Δ²-androsten-17β-ol. | Caproic anhydride. | Caproate of 5,10-methylene-19-nor-Δ²-androsten-17β-ol. |
| 5,10-methylene-19-nor-Δ³-androsten-17β-ol. | Propionic anhydride. | Propionate of 5,10-methylene-19-nor-Δ³-androsten-17β-ol. |
| 5,10-methylene-19-nor-Δ¹,³-androstadien-17β-ol. | Cyclopentylpropionic anhydride. | Cyclopentylpropionate of 5,10-methylene-19-nor-Δ¹,³-androstadiene-17β-ol. |
| 5,10-methylene-19-nor-androstan-17β-ol. | Cyclopentylpropionic anhdyride. | Cyclopentylpropionate of 5,10-methylene-19-nor androstan-17β-ol. |

Example XVI

In accordance with the method described in Example XIII the compounds below mentioned (I) were esterified with the indicated anhydride, to produce the corresponding esters:

| I | Anhydride | II |
|---|---|---|
| 5,10-methylene-17α-methyl-19-nor-androstan-17-β-ol-3-one. | Undecenoic | Undecenoate of 5,10-methylene-17α methyl-19-nor-androstan-17β-ol-3-one. |
| 5,10-methylene-17α-methyl-19-nor-Δ³-androsten-17β ol. | Acetic | Acetate of 5,10-methylene-17α-methyl-19-nor-Δ³-androsten-17β-ol. |
| 5,10-methylene-17α-methyl-19-nor-androstan-17β-ol. | Cyclopentyl-propionic. | Cyclopentylpropionate of 5,10-methylene-17α-methyl-19-nor-androstan-17β-ol. |
| 5,10-methylene-17α-ethyl-19-nor-androstan-17β-ol. | Enanthic | Enanthate of 5,10-methylene-17α-ethyl-19-nor-androstan-17β-ol. |
| 5,10-methylene-17α-vinyl-19-nor-Δ¹,³-androstadien-17β-ol. | Propionic | Propionate of 5,10-methylene-17α-vinyl-19-nor-Δ¹,³-androstadien-17β-ol. |
| 5,10-methylene-17α-vinyl-19-nor-Δ²-androsten-17β-ol. | Acetic | Acetate of 5,10-methylene-17α-vinyl-19-nor-Δ²-androsten-17β-ol. |
| 5,10-methylene-17α-vinyl-19-nor-androstan-17β-ol. | Caproic | Caproate of 5,10-methylene-17α-vinyl-19-nor-androstan-17β-ol. |
| 5,10-methylene-17α-ethinyl-19-nor-androstan-17β-ol. | Cyclopentyl-propionic. | Cyclopentylpropionate of 5,10-methylene-17α-ethinyl-19-nor-androstan-17β-ol. |

Example XVII

A solution of 1.1 equivalents of chromic acid in 5 cc. of 80% acetic acid was added dropwise to a stirred solution of 1 g. of 5,10-methylene-19-nor-androstan-17β-ol-3-one in 20 cc. of glacial acetic acid, while the temperature was maintained around 20° C. After 2 hours at room temperature, the mixture was poured into ice water and the formed precipitate collected, washed with water and recrystallized from methanol, thus giving 5,10-methylene-19-nor-androstane-3,17-dione.

Example XVIII

A mixture of 2 g. of 5,10-methylene-19-nor-androstan-17β-ol-3-one, 30 cc. of 2-methyl-2-ethyl-1,3-dioxolane and 70 mg. of p-toluenesulfonic acid was heated to boiling and refluxed with distillation for 1 hour. The mixture was cooled, diluted with water, extracted with ethyl acetate and the organic extract washed to neutral, dried and evaporated to dryness. Crystallization from acetone-hexane yielded 5,10-methylene-3-ethylenedioxy-19-nor-androstan-17β-ol.

A solution of the preceding compound in 40 cc. of pyridine was added to a mixture of 2 g. of chromium trioxide in 40 cc. of pyridine. The reaction mixture was kept at room temperature overnight. It was then diluted with ethyl acetate, filtered through celite and the filtrate washed well with water, dried and evaporated to dryness. Crystallization from acetone-hexane afforded 5,10-methylene-3-ethylenedioxy-19-nor-androstan-17-one.

The foregoing compound was treated with vinyl magnesium bromide, in accordance with the method of Example XII, thus producing 5,10-methylene-3-ethylenedioxy-17α-vinyl-19-nor-androstan-17β-ol.

A solution of 500 mg. of the latter compound in 30 cc. of acetone was treated with 50 mg. of p-toluenesulfonic acid and the reaction mixture kept at room temperature overnight. It was then poured into ice water, extracted with ethyl acetate and the organic extract washed with water to neutral, dried and evaporated to dryness. Addition of ether gave 5,10-methylene-17α-vinyl-19-nor-androstan-17β-ol-3-one.

Example XIX

By following the method described in Example XIV, 1 g. of 5,10-methylene-3-ethylenedioxy-19-nor-androstan-17-one was treated with potassium acetylide, and the resulting 5,10-methylene-3-ethylenedioxy-17α-ethinyl-19-nor-androstan-17β-ol was in turn hydrolyzed with p-toluenesulfonic acid in acetone solution, in accordance with the method of the preceding example, to produce 5,10-methylene-17α-ethinyl-19-nor-androstan-17β-ol-3-one.

Upon esterification of the latter compound with acetic, propionic and caproic anhydrides in benzene solution and in the presence of p-toluenesulfonic acid, there were obtained the acetate, propionate and caproate of 5,10-methylene-17α-ethinyl-19-nor-androstan-17β-ol-3-one.

I claim:

1. A compound represented by the general formula:

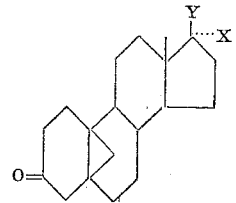

wherein X represents a member selected from the group consisting of hydrogen, a lower alkyl group, a lower alkenyl group and a lower alkinyl group, and Y represents a member selected from the group consisting of a hydroxyl group and an acyloxy group containing less than 12 carbon atoms.

2. 5,10-methylene-19-nor-androstan-17β-ol-3-one.
3. 5,10 - methylene - 17α - methyl - 19 - nor - androstan-17β-ol-3-one.
4. 5,10 - methylene - 17α - vinyl - 19 - nor - androstan-17β-ol-3-one.
5. 5,10 - methylene - 17α - ethinyl - 19 - nor - androstan-17β-ol-3-one.
6. A compound represented by the general formula:

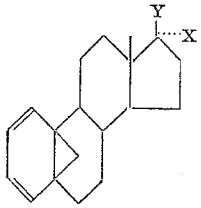

wherein X represents a member selected from the group consisting of hydrogen, a lower alkyl group, a lower alkenyl group and a lower alkinyl group; Y represents a member selected from the group consisting of a hydroxyl group and an acyloxy group containing less than 12 carbon atoms, and X and Y taken togther represent a keto group.

7. 5,10-methylene-19-nor-Δ¹,³-androstadiene-17β-ol.
8. 5,10-methylene-17α-mmethyl-19-nor-Δ¹,³-androstadiene-17β-ol.

9. 5,10-methylene-17α-vinyl-19-nor-Δ¹,³-androstadien-17β-ol.

10. 5,10-methylene-17α-ethinyl-19-nor-Δ¹,³-androstadien-17β-ol.

11. A compound represented by the general formula:

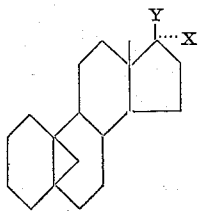

wherein X represents a member selected from the group consisting of hydrogen, a lower alkyl group, a lower alkenyl group and a lower alkinyl group; Y represents a member selected from the group consisting of a hydroxyl group and an acyloxy group containing less than 12 carbon atoms, and X and Y taken together represent a keto group.

12. 5,10-methylene-19-nor-androstan-17β-ol.
13. 5,10-methylene-17α-methyl-19-nor-androstan-17β-ol.
14. 5,10-methylene-17α-vinyl-19-nor-androstan-17β-ol.
15. 5,10-methylene-17α-ethinyl-19-nor-androstan-17β-ol.

16. A compound represented by the general formula:

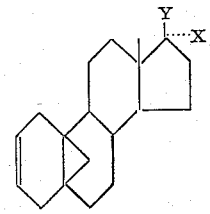

wherein X represents a member selected from the group consisting of hydrogen, a lower alkyl group, a lower alkenyl group and a lower alkinyl group; Y represents a member selected from the group consisting of a hydroxyl group and an acyloxy group containing less than 12 carbon atoms, and X and Y taken together represent a keto group.

17. 5,10-methylene-19-nor-Δ²-androsten-17β-ol.

18. A compound represented by the general formula:

wherein X represents a member selected from the group consisting of hydrogen, a lower alkyl group, a lower alkenyl group and a lower alkinyl group; Y represents a member selected from the group consisting of a hydroxyl group and an acyloxy group containing less than 12 carbon atoms, and X and Y taken together represent a keto group.

19. 5,10-methylene-19-nor-Δ³-androsten-17β-ol.

References Cited by the Examiner

Bonet et al.: Helv. Chim. Acta, vol. 45, pp. 2615–18 (1962).

LEWIS GOTTS, *Primary Examiner.*